United States Patent
Zhang et al.

(10) Patent No.: US 7,045,063 B2
(45) Date of Patent: May 16, 2006

(54) TREATMENT OF SWINE WASTEWATER BY BIOLOGICAL AND MEMBRANE SEPARATION TECHNOLOGIES

(75) Inventors: Ruihong H. Zhang, Davis, CA (US); Jane H. Turnbull, Los Altos, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/626,034

(22) Filed: Jul. 23, 2003

(65) Prior Publication Data

US 2005/0035059 A1   Feb. 17, 2005

Related U.S. Application Data

(60) Provisional application No. 60/398,949, filed on Jul. 26, 2002.

(51) Int. Cl.
- C02F 3/30 (2006.01)
- C05F 3/02 (2006.01)
- C05F 5/00 (2006.01)
- C05F 9/00 (2006.01)

(52) U.S. Cl. ............ 210/603; 210/605; 210/609; 210/631; 210/652; 210/198.1; 210/259; 71/9; 71/10

(58) Field of Classification Search .......... 210/603, 210/605, 609, 631, 198.1, 252, 259, 263, 210/652; 71/6, 9, 10
See application file for complete search history.

(56) References Cited

U.S. PATENT DOCUMENTS

| | | | |
|---|---|---|---|
| 3,386,910 A | * | 6/1968 | Forrest ............... 210/624 |
| 5,185,079 A | | 2/1993 | Dague |
| 5,578,214 A | * | 11/1996 | Yamasaki et al. ...... 210/650 |
| 6,086,765 A | | 7/2000 | Edwards |
| 6,235,196 B1 | | 5/2001 | Zhou et al. |
| 6,342,378 B1 | | 1/2002 | Zhang et al. |
| 6,352,643 B1 | | 3/2002 | Kwon et al. |

(Continued)

FOREIGN PATENT DOCUMENTS

| JP | 2-164500 A | 6/1990 |
|---|---|---|
| JP | 5-309391 A | 11/1993 |

OTHER PUBLICATIONS

Bilstad, "Nitrogen separation from domestic wastewater by reverse osmosis", *Journal of Membrane Science* 102: 93-102 (1995).

(Continued)

*Primary Examiner*—Fred G. Prince
(74) *Attorney, Agent, or Firm*—Townsend and Townsend and Crew LLP

(57) ABSTRACT

The present invention provides an integrated system for treatment of biodegradable waste, including sewage sludge, forestry waste, food waste, agricultural waste, municipal waste, and the like. The integrated system comprises an anaerobic reactor, at least one aerobic reactor, a filtration device, and a desalinization device.

37 Claims, 6 Drawing Sheets

U.S. PATENT DOCUMENTS

| | | | | |
|---|---|---|---|---|
| 6,517,723 | B1* | 2/2003 | Daigger et al. | 210/605 |
| 6,635,177 | B1* | 10/2003 | Oswald et al. | 210/602 |
| 6,676,836 | B1* | 1/2004 | Mandt | 210/605 |
| 2005/0006305 | A1* | 1/2005 | Juby et al. | 210/603 |
| 2005/0131086 | A1* | 6/2005 | Kohler et al. | 518/726 |

OTHER PUBLICATIONS

Bilstad et al., "Membrane Separation of RAW and Anaerobically Digested Manure", *Wat. Sci. Tech.* 25:10: 19-26 (1992).

Duvel et al., "Removal of wastewater organics by reverse osmosis", *Reverse Osmosis* 47:1: 57-65 (1975).

Li et al., "Integrated Anaerobic and Aerobic Sequencing Batch Reactor Systems for Dairy Wastewater Treatment", *ASAE Annual International Meeting*, paper 012294, 14 pages. (2001).

Lopez-Ramirez et al., "Pre-treatement optimization studies for secondary effluent reclamation with reverse osmosis", *Water Research* 37: 1177-1184 (2003).

Ozaki et al., Rejection of organic compounds by ultra-low pressure reverse osmosis membrane, *Water Research* 36: 123-130 (2002).

Zhang et al., "Treatment of Swine Wastewater by Biological and Membrane Separation Technologies", *ASAE Meeting Presentation* paper No. 024096, 14 pages (2002).

* cited by examiner

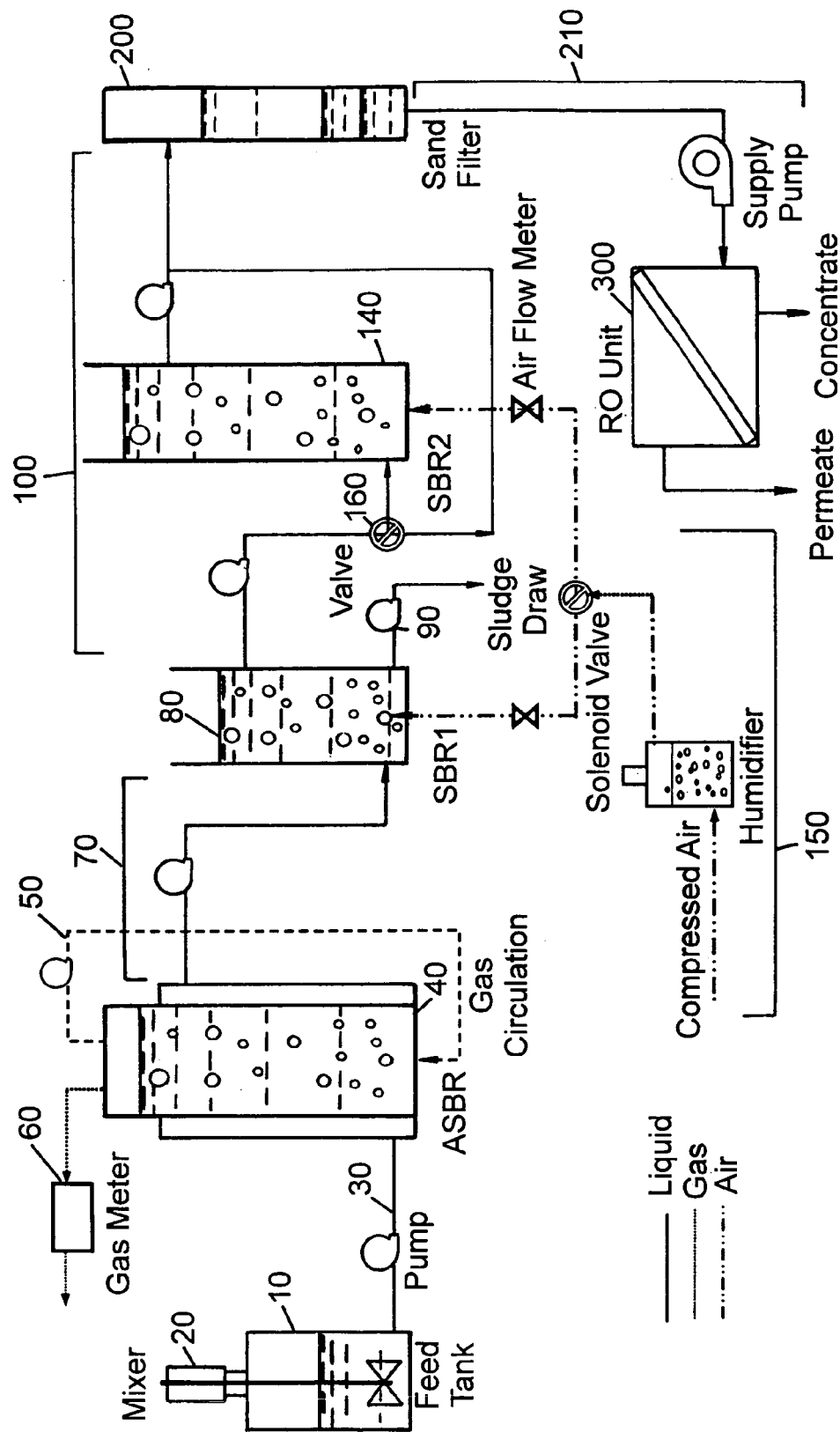
Figure 3 Schematic of laboratory wastewater treatment system.

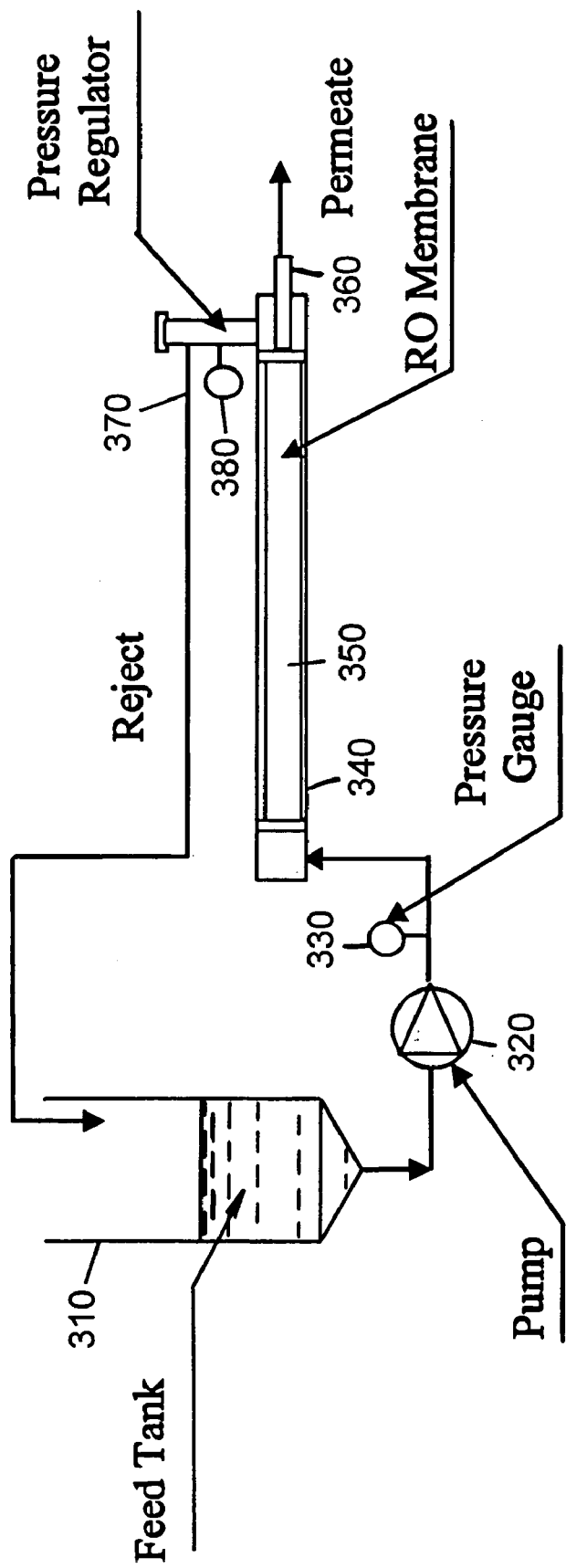
Figure 4. Schematic of the RO membrane separation test unit.

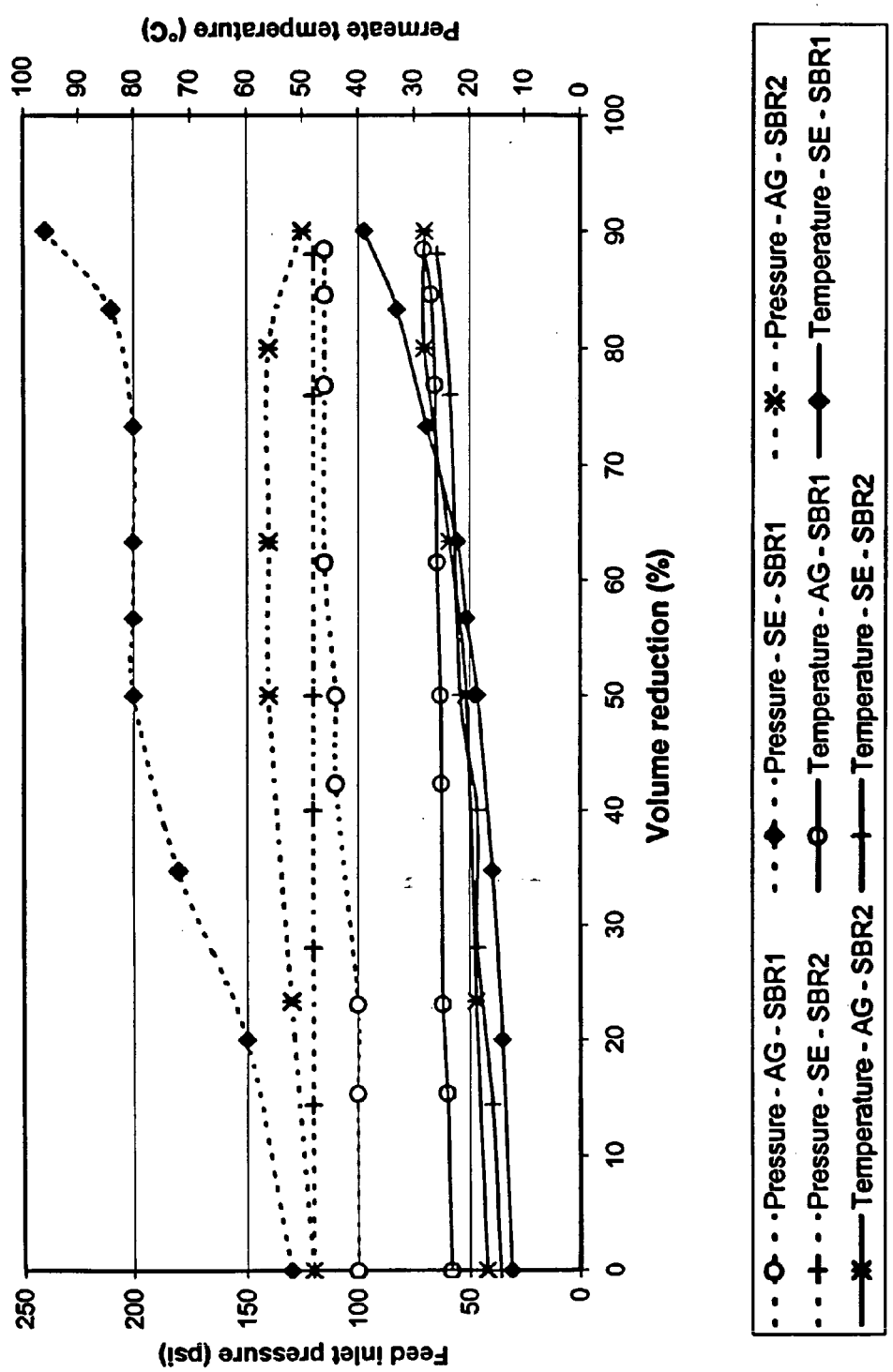
Figure 5. Feed inlet pressure and permeate temperature at different volume reductions

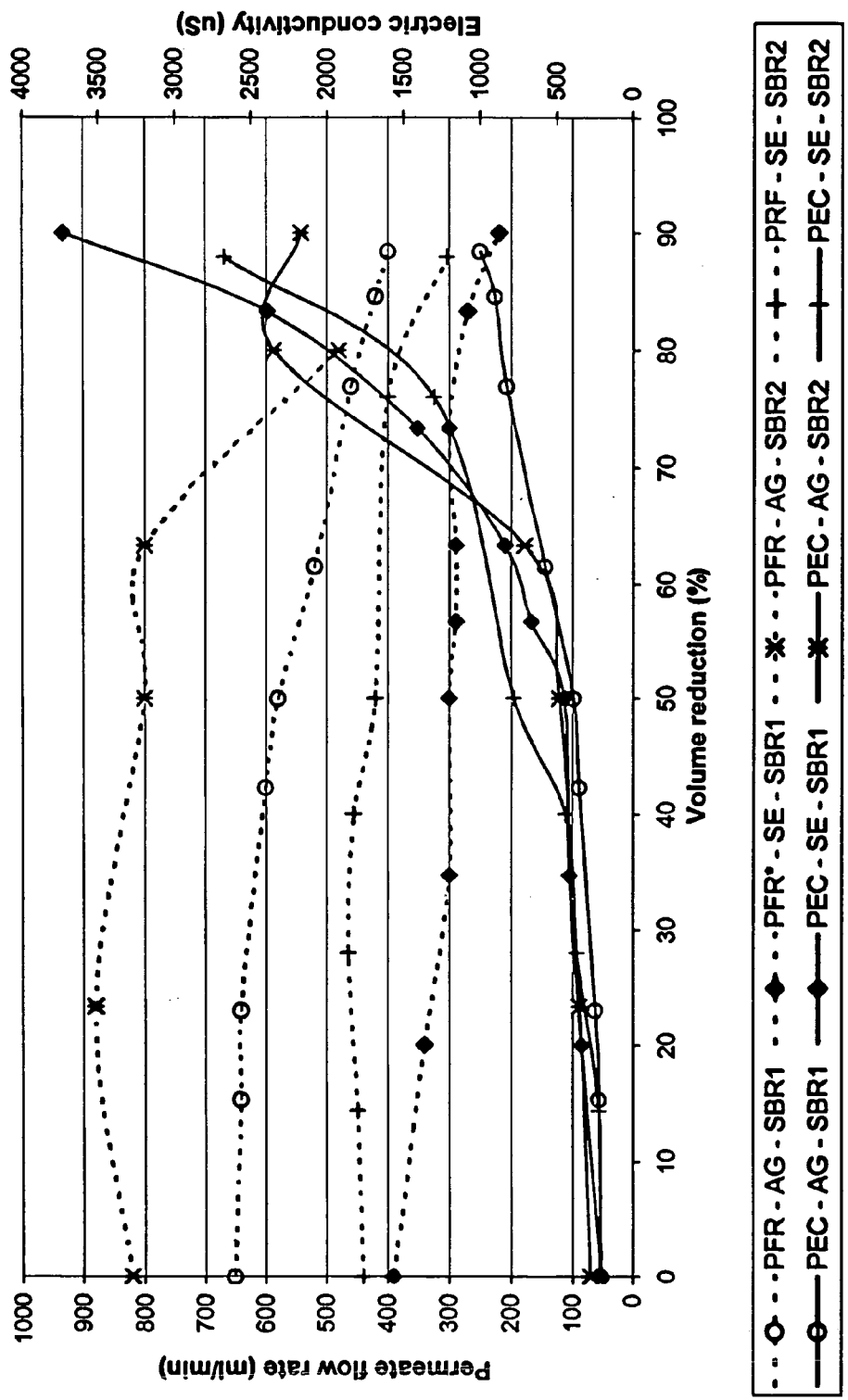
Figure 6. Permeate flow rate and electric conductivity at different volume reductions (PFR – permeate flow rate, PEC – permeate electric conductivity, AG – AG2540, SE – SE2540)

TREATMENT OF SWINE WASTEWATER BY BIOLOGICAL AND MEMBRANE SEPARATION TECHNOLOGIES

CROSS-REFERENCES TO RELATED APPLICATIONS

This application claims the benefit of provisional U.S. Application No. 60/398,949, filed Jul. 26, 2002, which is herein incorporated by reference for all purposes.

STATEMENT AS TO RIGHTS TO INVENTIONS MADE UNDER FEDERALLY SPONSORED RESEARCH OR DEVELOPMENT

This invention was made with Government support under SBIR Grant No. 2001-33610-10362, awarded by the United States Department of Agriculture. The Government has certain rights in this invention.

BACKGROUND OF THE INVENTION

Waste management is a major challenge for may animal feeding operations agricultural production and processing operations, and food service businesses. Nearly 40% of feed dry matter and up to 70% of nutrients fed to the animals is excreted in manure, and increasingly significant amounts of labor and capital are being invested in efforts to better manage this organic material. Plant residues and processing byproducts need to be more efficiently managed and utilized as valuable resources.

Liquid manure handling and storage systems are commonly used on livestock farms. Most of the water used on livestock farms and later added into the manure system originates from building and equipment washing activities. In the areas where water resources are limited and/or disposal of a large quantity of wastewater is problematic, reclamation of clean water from animal wastewater is necessary. Producing biogas for fuel and nutrient-rich fertilizer products while simultaneously achieving water reclamation will help with the economics of wastewater treatment. Thus there is a need for an energy efficient, integrated animal wastewater treatment system for water reclamation as well as biogas and organic fertilizer production. The present invention solves this and other wastewater treatment problems Due to high concentrations of organic and inorganic matter present in wastewater, extensive pretreatment is normally required to assure normal operation of reverse osmosis (RO) membranes. Due to high treatment cost, reclamation of clean water from animal wastewater normally is not an economically favorable endeavor, unless other valuable products can be produced along with water to offset the cost of wastewater treatment. Combining biological treatment processes, such as anaerobic digestion, with membrane separation have been attempted before by Bilstad et al. (Bilstad et al., *Wat. Sci. Tech.* 25(10):19–26 (1992)). Reverse osmosis (RO) coupled with anaerobic digestion as pretreatment was studied in both pilot and full scale. An RO module consisted of 18 tubular polyamide membranes were used to treat the anaerobically digested pig manure that had undergone chemical treatment and mechanical solid-liquid separation. The pilot membrane separation trials were performed on a batch basis, i.e. the RO reject was returned to the feed tank. After RO treatment, 95% of total nitrogen was removed from the liquid fraction. The efficacy of using an integrated anaerobic and aerobic treatment system for animal wastewater has been demonstrated. (Li and Zhang, American Society of Agricultural Engineers Meeting, Sacramento, Calif. ASAE Paper No. 012294 (2001)).

Water reclamation from wastewater requires removal of organic and inorganic compounds from water. Membrane separation technologies have been applied to separation of solids and recovery of materials from waste streams, purification of polluted water, and desalination of salt water. (Duvel and Helfgott, *J of Water Pollution Control Fed.* 47:57–65 (1975); Bilstad, *Science* 102:93–102 (1995); and Ozaki and Li, *Water Research* 36:123–130 (2002)). Practical membrane applications vary from small-scale batch to large, continuous separations. Reverse Osmosis (RO) is one of the commonly used membrane separation processes. It is capable of removing a wide spectrum of impurities in liquids at high efficiencies. (Bilstad, 1995, supra). For applications of domestic and industrial applications, solids sedimentation and chemical precipitation are common pretreatment methods prior to membrane separation (Lopez-Ramirez et al., *Water Research* 37:1177–1184 (2002)).

There is a need for an integrated system of waste treatment to provide highly purified end products that do not require further treatment. The present invention solves this and other problems.

BRIEF SUMMARY OF THE INVENTION

This invention provides an integrated wastewater treatment system comprising a biological degradation system, (e.g., anaerobic treatment and aerobic treatment), a filtration system, and a desalinization system. The system can be used to treat wastewater from a variety of sources including but not limited to, sewage, forestry waste, food waste, agricultural waste, municipal waste, waste from fermentation processes, such as alcohol, acid and other biochemical fermentation processes, and the like.

In one embodiment, the invention provides a wastewater treatment system that includes an anaerobic reactor; at least one aerobic reactor; a filtration device; and a desalinization device. Conduits are used to connect the components of the system, e.g., a conduit connects the anaerobic reactor to the aerobic reactor; a second conduit connects the aerobic reactor to the filtration device; and a third conduit connects the filtration device to the desalinization device. In some embodiments the conduit is a direct connection between two components of the system. In one aspect, the aerobic reactor comprises an aeration device.

In another embodiment, the invention provides a wastewater treatment system that includes a second aerobic reactor. The second aerobic reactor can be part of a conduit from the first reactor. A valve can be included to direct flow of liquid from the first aerobic reactor to the filtration device; or to direct flow of liquid from the first aerobic reactor to the second aerobic reactor, and then to the filtration device. In one aspect, the second aerobic reactor comprises an aeration device.

In another embodiment, the invention provides a wastewater treatment system that includes a sludge holding member. The sludge holding member can be used to draw off particulate matter from the wastewater as it passes through the system. The sludge holding member can be part of a conduit between components of the invention, e.g., between an anaerobic reactor and an aerobic reactor, between two or more aerobic reactors, between an aerobic reactor and a filtration device. In one aspect the sludge holding member is a sludge settling tank. In another aspect, the sludge holding member includes a sludge dewatering device. Examples of sludge dewatering devices include a filter press, a screw press, or a belt press.

In another embodiment, the invention provides a wastewater treatment system that includes a first and second aerobic reactor and sludge holding member. The second aerobic reactor and sludge holding member can both be included in a conduit from the first aerobic reactor to another component of the system. In one aspect the sludge holding member is a sludge settling tank. In another aspect, the sludge holding member includes a sludge dewatering device. Examples of sludge dewatering devices include a filter press, a screw press, or a belt press. The integrated system can provide a first liquid conduit, that connects the first aerobic reactor to the second aerobic reactor or to the filtration device and transfers liquid effluent from the first aerobic reactor to the second aerobic reactor or to the filtration device; and a first sludge conduit that connects the first aerobic reactor to the sludge holding member and transfers sludge from the first aerobic reactor to the sludge holding member. The system can also include a second liquid conduit to connects the sludge holding member and the first liquid conduit and transfer liquid removed from the sludge back to the first conduit for further treatment, e.g., transfer to a second aerobic reactor or a filtration device. In a further aspect, a second sludge conduit, connects the second aerobic reactor to the sludge holding member for transfer of sludge from the second aerobic reactor to the sludge holding member. The sludge holding member can also include a sludge dewatering device without a sludge holding tank.

In one aspect of the invention, the anaerobic reactor is an Anaerobic Biofilm Sequencing Batch Reactor (ABSBR). In another aspect of the invention, the anaerobic reactor is an Anaerobic Sequencing Batch Reactor (ASBR). In a further aspect of the invention, the anaerobic reactor includes an anaerobic reactor gas outlet, and methane gas is captured from the anaerobic reactor gas outlet.

In one aspect of the invention, the filtration device is selected from a sand filter, a microfilter, a belt filter, a pressure filter, a vacuum filter, an activated charcoal filter, and biomass filter.

In one aspect of the invention, the desalinization device is selected from reverse osmosis membrane separation units, ultrafiltration units, activated carbon filters, and ion exchange resins. In a preferred embodiment, the desalinization device is a reverse osmosis membrane separation units. The reverse osmosis membrane separation unit preferably includes a reverse osmosis membrane separation unit permeate outlet, and a reverse osmosis membrane separation unit concentrate outlet.

In one embodiment, the invention provides a method of treating wastewater, including anaerobic treatment, aerobic treatment, filtration, and desalinization. In a further embodiment, the aerobic treatment step is performed twice.

Sludge can be removed from the waste material during the process by use of a sludge holding member, e.g., a sludge holding tank or a sludge dewatering device. The sludge dewatering device and sludge holding tank can be used alone or in combination.

The methods of the invention can be used to treat food a variety of waste products, including food waste products, animal waste products, and biological fermentation wastes.

Examples of anaerobic reactors that can be used in the methods of the invention include an Anaerobic Biofilm Sequencing Batch Reactor (ABSBR), an Anaerobic Sequencing Batch Reactor (ASBR), a completely mixed reactor, or a plug flow reactor. The methods of the invention can also include a step of capturing methane gas from the anaerobic reactor.

Examples of filtration devices that can be used in the methods of the invention include a sand filter, a microfilter, a belt filter, a pressure filter, a vacuum filter, an activated charcoal filter, and biomass filter.

Examples of desalinization devices that can be used in the methods of the invention include a reverse osmosis membrane separation unit, an ultrafiltration unit, an activated carbon filter, and an ion exchange resin. In a preferred embodiment, the desalinization device is a reverse osmosis membrane separation unit. In a further preferred embodiment, the products of the methods of the claimed invention include reclaimed water and concentrated liquid fertilizer.

Flocculent chemicals can be added to an anaerobic reactor, an aerobic reactor, a sludge holding member, a conduit, or a filtration device to aid in removal of particulate material from the wastewater.

BRIEF DESCRIPTION OF THE DRAWINGS

FIG. 1 depicts an integrated system combining anaerobic digestion, aerobic treatment, a filtration device, and reverse osmosis is used to treat wastewater from a variety of sources.

FIG. 2 provides another embodiment of the integrated system.

FIG. 3. FIG. 3 provides a schematic of a laboratory wastewater treatment system.

FIG. 4. FIG. 4 provides a schematic of a conventional reverse osmosis membrane separation test unit.

FIG. 5. FIG. 5 depicts feed inlet pressure and permeate temperature at different volume reductions during reverse osmosis filtration.

FIG. 6. FIG. 6 depicts permeate flow rate and electric conductivity at different volume reductions during reverse osmosis filtration. (PFR—permeate flow rate, PEC—permeate electric conductivity, AG—AG2540, SE—SE2540)

DEFINITIONS AND ABBREVIATIONS

Figure 1:
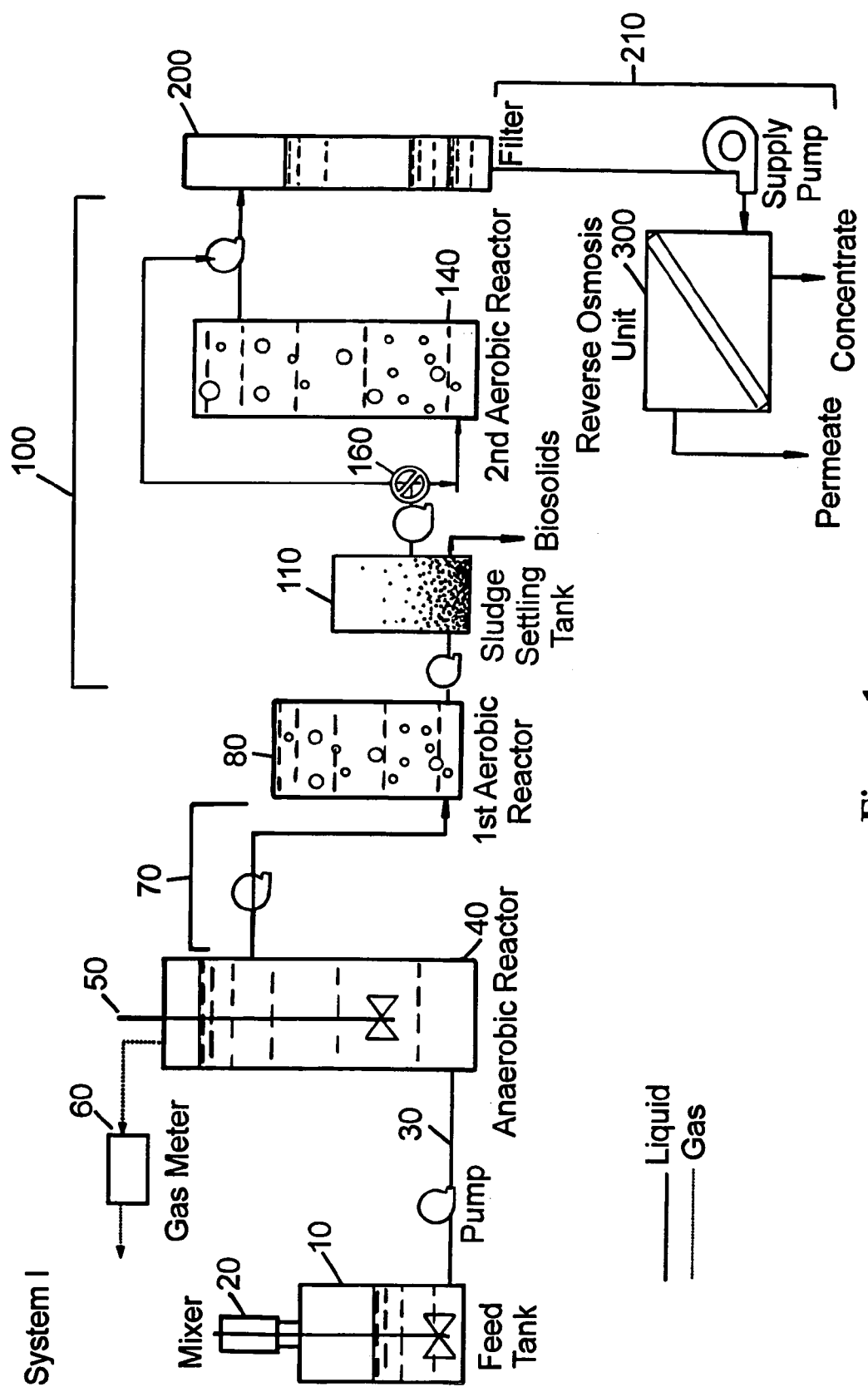
FIG. 1.

TS, total solids; VS, volatile solids; VSS, volatile suspended solids; VFA, volatile fatty acids; SRT, solid retention time; HRT, hydraulic retention time; COD chemical oxygen demand; TN, total nitrogen; TKN, total Kjeldahl nitrogen; $NH_3$—N, ammoniacal nitrogen; $NO_2$—N, nitrite nitrogen, $NO_3$—N, nitrate nitrogen; EC electrical conductivity; TC, total coliforms.

As used herein, the term "organic substrate" refers to carbonaceous feedstock which can be used in the process and device of the invention to produce methane.

The terms "biogasification" and "methanogenesis" are used herein essentially interchangeably.

The term "conduit" refers to a passageway for transfer of liquid or gas from one vessel to another. Exemplary conduits are tubing or pipe, although a conduit is not limited to a single tubing or pipe. Conduit also encompasses a direct connection from one vessel to another. Pumps and valves can be included in a conduit to facilitate transfer of a liquid or gas. In addition to tubing or pipe conduits can include other elements of the invention, e.g., an anaerobic or aerobic reactor, a sludge holding member and/or a sludge dewatering device, a filtration device, or a desalinization device. Connecting means is used interchangeably with conduit.

In one embodiment, a conduit between a first aerobic reactor and a filtration device comprises a second aerobic reactor. In another embodiment, a conduit between a first aerobic reactor and a filtration device has two passageways between the first aerobic reactor and the filtration device: one passage way comprises a second aerobic reactor and the other passageway does not. The conduit can include at least one valve to allow the user to select the direction of liquid flow, e.g. from the first aerobic reactor to the second aerobic reactor, and then to the filtration device; or from the first aerobic reactor to the filtration device. Those of skill will recognize that, if the conduit comprises a sludge holding member or a sludge dewatering device, the liquid material can pass through those on the way to the second aerobic reactor or filtration device.

The invention provides for movement of material (i.e., both solid and liquid components or the two combined) via conduits or connecting means) from one vessel to another (e.g., feed tanks, anaerobic reactors, aerobic reactors, sludge holding members, filtration devices, and desalinization devices.) Those of skill will recognize that a vessel comprises inlets and outlets to allow material to pass to or through a vessel during the operation of the claimed invention.

Some vessels are designed to hold volumes of material for a period of time, e.g., aerobic reactors, anaerobic reactors, or sludge holding devices. In some embodiments, such vessels can be made of stainless steel or earthen or concrete tanks. The tanks can be above or below ground.

The term "filtration device" refers to a device that removes particles from a liquid as the liquid passes through the device. Exemplary filtration devices include, for example, sand filters, microfilters, vacuum filters, activated carbon filters, and belt filters.

The term "aeration device" refers to a device that introduces oxygen or other gasses into a reactor. Aeration devices include mechanical aerators or compressed air.

The term "sludge holding member" refers to a container that holds or is used to collect the particulate components of an effluent produced by the claimed invention. Sludge holding members include "sludge settling tanks" and can also comprise devices to facilitate collection of the particulate components of an effluent, e.g., a sludge dewatering device such as a filter press, a screw press, or a belt press. Alternatively sludge dewatering devices are incorporated into an integrated system without a sludge holding member. In some embodiments the sludge can be removed from the system and taken to a sludge dewatering device at a different location for sludge removal and the clarified liquid can be returned to the integrated system.

A quiescent settling period is a period of time when a mixture comprising wastewater, untreated or treated as claimed herein, is allowed to settle with out stirring, aeration, or other mixing. During the quiescent settling period particulate components will settle out of the mixture. The amount of time required for settling will depend on the size of the particulate components. The quiescent settling time can be used to remove at least 10%, 20%, 25%, 30%, 40%, 50%, 60%, 70%, 75%, 80%, 85%, 90%, 95%, or up to 100% of the particulate components.

The term "material" refers to the mixture of solid and liquid components of wastewater and associated wastewater products formed in the claimed wastewater treatment system. The term "effluent is used in a similar manner. A "clarified effluent" or liquid effluent has had at least a portion of particulate material removed, e.g., at least 10%, 20%, 25%, 30%, 40%, 50%, 60%, 70%, 75%, 80%, 85%, 90%, 95%, or up to 100% of the particulate components. "Solid effluent" and "sludge" are used interchangeably.

DETAILED DESCRIPTION OF THE INVENTION

I. Introduction

The present invention provides an integrated system combining anaerobic digestion, aerobic treatment, a filtration device, and membrane separation is used to treat wastewater from a variety of sources. Aerobic treatment is used for further treatment of digester effluent prior to filtration and membrane separation, instead of chemical treatment. The system provides useful end products, including methane, concentrated fertilizer, and reclaimed water, preferably of high quality. Reclaimed water refers to end product water that has greater than 50%, 60%, 70%, 75%, 80%, 85%, 90%, 91,%, 92%, 93%, 94%, 95%, 96%, 97%, 98%, or 99% reduction in organic or inorganic matter when compared to the starting wastewater.

II. Substrates of the Integrated Wastewater Treatment System

The process of the invention can be practiced with any wastewater comprising biodegradable organic substrate including, but not limited to, sewage, forestry waste, food waste, agricultural waste, municipal waste, waste from fermentation processes, such as alcohol, acid and other biochemical fermentation processes, and the like.

Municipal waste primarily contains cellulosic products, particularly kraft paper. It is known that such cellulosics can be digested as well as the minor amounts of waste protein, carbohydrates and fat present in municipal waste.

In a presently preferred embodiment, the organic substrate consists, at least in part, of an agricultural waste. Agricultural wastes include both plant and animal wastes. Many types of agricultural waste can be used in conjunction with the present invention. Useful agricultural wastes include, but are not limited to, foliage, straw, husks, fruit, manure and the like.

III. Products of the Integrated Wastewater Treatment System

The products of the integrated wastewater system include methane gas from anaerobic treatment of the waste material. After additional aerobic treatment, filtration, and membrane separation, products can include biosolids, reclaimed water of high quality, and liquid fertilizer containing ammonia, nitrates, phosphates, potassium, and other useful nutrient elements.

IV. Components of the Integrated Wastewater Treatment System

The integrated wastewater treatment system includes an anaerobic reactor, at least one aerobic reactor, a filtration device, and a membrane separation unit. The components of the invention are connected by conduits that allow the passage of materials, for example tubing or pipe. In some embodiments, materials are transferred from one component to another via gravity flow. In some embodiments, a pumping mechanism, such as a peristaltic pump or centrifugal pump is used to facilitate the transfer of material from one component to another.

A. Anaerobic Reactor

Anaerobic digestion has been known to stabilize sewage sludge, animal waste, and other predominantly organic materials, and usable product gas, of varying composition, has been obtained from such anaerobic digestion processes. The organic feed mixture which provides the substrate for anaerobic bacteria can comprise a wide variety of organic carbon sources, ranging from raw sewage sludge to municipal refuse, or biomass material such as plants and crop wastes, and various animal wastes and byproducts. The process of anaerobic digestion degrades any of these organic carbonaceous materials, under appropriate operating conditions, to product gas which contains the desirable methane gas.

Those of skill in the art will recognize that, since methane gas is a desirable product of anaerobic digestion, the anaerobic digester can include means to capture gaseous end products, comprising methane. Means to measure collected methane can also be included in the anaerobic digester.

Those of skill will also recognize that anaerobic digestion can be optimized by growing the culture at a preferred temperature, e.g. from about 10° C. to about 57° C. Thus, the anaerobic reactor can also include means to regulate temperature.

Anaerobic reactors also have mechanisms to facilitate mixing of the bacterial culture, and liquid and solid waste. Any means known in the art for agitating a liquid or suspension can be used in the system of the invention. Exemplary means include, but are not limited to, overhead stirrers, gas or motor driven stirrers, magnetic stirrers, shakers, homogenizers, sonicators, gas bubbling tubes, ebulliators and the like. Other useful agitating means will be apparent to those of skill in the art.

Anaerobic digestion uses a consortium of bacteria to degrade and then convert an organic substrate into a mixture of carbon dioxide and methane. The existing anaerobic digestion systems for organic substrate digestion can be separated into two major types, one-phase systems and two-phase systems. The one-phase anaerobic digestion systems have all biochemical conversion steps involved in the anaerobic digestion process, such as hydrolysis, acidification and methanogenesis, performed in one reactor. The two-phase systems separated hydrolysis and acidification steps from methanogenesis step into two sequential stages. The two-phase systems have been found to enhance the conversion efficiency, such as described in Pohland and Ghosh, *Biotechnol. and Bio-eng. Symp.* No. 2, 85–106 (1971), John Wiley and Sons, Inc. and by the same authors in *Environmental Letters,* 1: 255–266 (1971). Anaerobic reactors of various designs can be used for both one- and two-phase systems. The examples are constantly stirred tank reactor (CSTR, also called completely mixed reactor), plug flow reactor, upflow sludge blanket reactor (UASB), anaerobic sequencing batch reactor (ASBR), anaerobic biofilter, expanded bed reactor, and anaerobic mixed biofilm reactor (AMBR). U.S. Pat. No. 5,185,079 describes an anaerobic sequencing batch reactor (ASBR). The Aanaerobic Biofilm Sequencing Batch Reactor (ABSBR) is a new bioreactor recently developed and included in this invention. The ABSBR is an improvement of ASBR by adding attachment growth in the reactor to increase bacterial populations and solids retention time. The ABSBR uses porous biomedia that fills ¼ to ½ reactor working volume to provide attachment surfaces for the bacteria. The porous media can be made of inert materials, such as polyethanelene, with a density of about 1 g/cm$^3$. When placed in the reactor, they should move freely in the liquid when the reactor is mixed. This way, excess biomass or solids can fall off the biomedia to avoid biomedia clogging problems.

Two phase anaerobic digestion has been carried out in a single reactor as taught, for example, by U.S. Pat. No. 4,735,724 which teaches a non-mixed vertical tower anaerobic digester and anaerobic digestion process which provides passive concentration of biodegradable feed solids and microorganisms in an upper portion of a continuous digester volume and effluent withdrawal from the middle to the bottom portion of the digester, resulting in increased solids retention times, reduced hydraulic retention times and enhanced bioconversion efficiency.

U.S. Pat. No. 4,022,665 discloses certain specific operating conditions for a two phase anaerobic digestion process, such as feed rates and detention times, which promote efficient conversion of organic materials. Additionally, the '665 patent discloses two separated biogasification reactors, a biogasification reactor I operated in series with a biogasification reactor II. The biogasification reactor II receives effluent fluid and/or effluent gas from biogasification reactor I. A somewhat similar process is disclosed in U.S. Pat. No. 4,696,746 which teaches a process for two phase anaerobic digestion with two discrete biogasification reactors operated in parallel.

U.S. Pat. No. 3,383,309 teaches that the rate and efficiency of the anaerobic digestion process, particularly in the methane forming phase, are increased when hydrogen gas is introduced into the digester sludge. According to the '309 patent, hydrogen gas is introduced into both the acid forming and the methane forming phases, to increase the availability of energy rich "hyper-sludge." All improvements disclosed in U.S. Pat. No.s 4,022,665, 4,696,746 3 and 383,309 can be adapted for use according to the improved process of the present invention and the teachings of that patent are incorporated herein by reference.

French Patent No. 78 34240 describes an apparatus for biogasification which is known in the art as an upflow sludge blanket reactor. This apparatus utilizes a two-stage digestion apparatus. The apparatus is designed for and uses continuous recirculation between the reactors of the two stages. Continuous recirculation requires a relatively complex apparatus including filters, pumps and manifolded inlets to disperse the recirculated liquid stream and to avoid its Ashort circuiting directly to the outlet of the reactor into which it was just circulated. Additionally, the continuous recirculation requires two pumps that must operate continuously. In contrast, the present invention utilizes intermittent recirculation.

The sequential batch anaerobic composting (SEBAC) reactor is a relatively new digestion system. See, Chynoweth et al., *Appl. Biochem. Biotech.* 28: 421–32 (1991). The SEBAC system consists of three reactors. Each reactor operates as a single phase batch digester. The three reactors are interconnected and operated on a different digestion schedule, the first being newly started, the second running in the middle of a digestion and the third running toward the end of a digestion. When new feedstock is loaded into the first reactor, the liquid from the third reactor is transferred to the first reactor to inoculate the feedstock and speed-up the digestion process.

U.S. Pat. No. 6,342,378 discloses a two phase system for anaerobic treatment of agricultural waste. Solid agricultural waste is first incubated with hydrolytic bacteria in the upper chamber of a hydrolysis vessel. The hydrolysis of the solid agricultural waste forms an aqueous hydrolysis mixture comprising volatile fatty acids which is filtered into the lower chamber of the hydrolysis vessel. The aqueous hydrolysis mixture is then transferred to a methanogenisis reactor and incubated with methanogenic bacteria to form the product methane.

A broad range of organic substrates are appropriate feedstocks for biogasification reactors. An exemplary feedstock is agricultural waste. Agricultural waste consists mostly of carbonaceous organic materials and it presents a particularly attractive renewable source of raw material for the generation of methane. The use of agricultural waste for this purpose serves a dual purpose, it produces a useful product and reduces the volume of agricultural waste which must be disposed of. Many different types of agricultural waste can be digested utilizing a two phase anaerobic digestion scheme.

Any active hydrolytic, acedogenic, or methane producing psychophilic, mesophilic, or thermophilic anaerobic digestion system can be used in the present invention. Methane-producing anaerobic systems utilizing acid forming bacteria and methane-producing bacteria, as are well known to be employed to produce methane from sewage sludge, can be employed in the practice of the present invention. A review of the microbiology of anaerobic digestion is set forth in Anaerobic Digestion, 1. The Microbiology of Anaerobic Digestion, D. F. Toerien and W. H. J. Hattingh, Water Research, Vol. 3, pages 385–416, Pergamon Press (1969). As set forth in that review, the principal suitable acid forming species include, species from genera including, but not limited to, *Aerobacter, Aeromonas, Alcaligenes, Bacillus, Bacteroides, Clostridium, Eschericia, Klebsiella, Leptospira, Micrococcus, Neisseria, Paracolobacterium, Proteus, Pseudomonas, Rhodopseudomonas, Sarcina, Serratia, Streptococcus* and *Streptomyces*. Also of use in the present invention are microorganisms which are selected from the group consisting of *Methanobacterium omelianskii, Mb. formicium, Mb. sohngenii, Methanosarcina barkerii, Ms. methanica* and *Mc. mazei* and mixtures thereof. Other useful microorganisms and mixtures of microorganisms will be apparent to those of skill in the art.

A wide variety of substrates are utilized by the anaerobic bacteria, but each species is believed to be characteristically limited to the use of a few compounds. It is therefore believed that several species of methane producing bacteria are advantageous for complete fermentation of the compounds present in certain organic substrates such as in animal and food waste.

An operative mixed culture is capable of sustaining itself indefinitely as long as a fresh supply of organic materials is added because the major products of the fermentation are gases, which escape from the medium leaving little, if any, toxic growth inhibiting products. Mixed cultures generally provide the most complete and stable fermentation action. Nutritional balance and pH adjustments can be made as is known in the art to favor hydrolytic activity or methanogenic activity.

As discussed in U.S. Pat. No. 4,022,665, issued May 10, 1977 to Ghosh et al., various studies in the art have demonstrated that a number of acids are converted to methane and carbon dioxide when such acids are contacted with mixed anaerobic cultures. For example, the fermentation of acetic, propionic and butyric acids, as well as ethanol and acetone, all result in the production of methane and carbon dioxide. Only the ratio of methane to carbon dioxide changes with the oxidation level of the particular substrate. Studies in the art have also established that carbon dioxide can be methanated by the oxidation of hydrogen. It has also been advanced that carbon dioxide could be converted to methane in a step-by-step reduction involving formic acid or carbon monoxide, formaldehyde and methanol as intermediates. Whatever the actual underlying mechanism, it is accepted that carbon dioxide can participate in the methanation process. Applicants provide the above discussion as useful background and are not binding themselves to any particular theory of operation.

Mechanical, thermal, or chemical treatment of the organic substrate may be required either to achieve a particle size appropriate for use in anaerobic digestion according to the invention or to render the carbonaceous components of the organic substrate more accessible to the digestion media. Suitable methods of mechanical treatment are known in the art. Various pretreatment of the organic substrate can advantageously be used with the present invention, such as acid or alkaline hydrolysis, or enzymatic hydrolysis.

Any anaerobic reactors, including those listed above, can be used as part of the claimed integrated system of wastewater treatment.

B. Aerobic Reactor

One or more aerobic reactors are used to further process the effluent of the anaerobic reactor. Aerobic reactors generally comprise a tank or channel that allows a mixture of aerobic and/or facultative bacteria and waste material to come into contact with oxygen. Thus, much of the decomposition in an aerobic reactor is a result of oxidation of waste materials. Aerobic reactors are useful in removing organic compounds from the liquid waste material through a combination of biological oxidation and solid settling.

Bacteria for use in an aerobic reactor are known to those of skill in the art. They include aerobic and facultative heterotrophic bacteria, which carry out the degradation and oxidation of carbonaneous compounds, and nitrifying bacteria, which carry out the oxidation of nitrogen.

Oxygen can be provided into an aerobic reactor by various aeration devices known in the art. For example, the reactor can be aerated by addition of compressed air or pure oxygen. In some embodiments, the compressed air is humidified before addition to the aerobic reactor.

Aerobic reactors also have mechanisms to facilitate mixing of the bacterial culture, the liquid waste, and $O_2$. Any means known in the art for agitating a liquid or suspension can be used in the system of the invention. Exemplary means include, but are not limited to, overhead stirrers, gas or motor driven stirrers, magnetic stirrers, shakers, homogenizers, sonicators, gas bubbling tubes, ebulliators and the like. Other useful agitating means will be apparent to those of skill in the art. Those of skill in the art will also recognize that humidifiers can be used to humidify gases, including compressed air, that are used to oxygenate the culture.

Those of skill will also recognize that, in some instances, aerobic digestion can be optimized by growing the culture at a preferred temperature, e.g. from ambient temperature to about 60° C. Thus, the aerobic reactor can also include means to regulate temperature.

If desired by the user the aerobic reactor can have a sludge draw for removal of culture and excess solids. The sludge draw is frequently included if a sequencing batch reactor is used. The mixed culture is allowed to settle into clarified liquid and sludge (mixed bacteria and waste solids) fractions, allowing removal of the clarified liquid, or excess sludge as required.

The aerobic reactors are used to accomplish carbon oxidation alone or both carbon oxidation and nitrogen oxidation. The latter two processes can be carried out in one or two reactors. If one aerobic reactor is used, a relatively long retention time is usually needed to ensure the healthy growth of both heterotrophic and nitrification bacteria, especially for treating the materials that have high COD to nitrogen ratio (COD/N). If two aerobic reactors are used, the operating conditions of the two reactors can be optimized for heterotrophilic and nitrification bacteria, respectively. For treating the material that has high COD/N, a combination of biological oxidation and solids settling can be used in the first reactor to reduce the COD in the effluent in order to favor the subsequent nitrification process in the second reactor. From the standpoint of nitrogen, in a two-stage system, the effluent from the first reactor will contain predominantly $NH_4^+$ and the effluent from the second reactor will contain $NH_4^+$, $NO_2^-$, and $NO_3^-$.

C. Filtration Devices

The effluent from the one or more aerobic reactors is processed through a filtration device. The filtration device is useful for removal of suspended solids in the liquid effluent. A sand filter, for example, is comprised of sections with progressively smaller sizes of sand grains. Those of skill will recognize that other filtration devices, including microfilters, pressure filters, vacuum filters, biomass filters, activated carbon filters, and belt filters, can be used to remove suspended solids from the effluent.

D. Desalinization Devices

Desalinization devices are used to remove organic and inorganic compounds (mainly soluble) from the filtration device effluent. Use of desalinization device can result in highly purified water as an end product. Desalinization devices can remove soluble materials by size or by charge. Separation by size is done using reverse osmosis membrane separation units or ultrafiltration units, for example. Separation by charge is done using activated carbon filters or ion exchange resins. These devices can be used alone or in combination. For examples of desalinization devices see Cheremisinoff, P. N. 1995. *Handbook of Water and Wastewater Treatment Technology*. Marcel Dekker, Inc. 270 Madison Avenue, New York, N.Y. 10016, herein incorporated by reference for all purposes.

In a preferred embodiment, reverse osmosis is used to further purify the water from the effluent, while at the same time concentrating various organic and inorganic compounds that remain in the effluent. Reverse osmosis uses a semipermeable membrane to remove salts, nitrogenous compounds, and other impurities from water. Purified water flows through the membrane (e.g., the permeate), while salts and other constituents are rejected and concentrated (e.g., the reject fraction or concentrate). Pumps are used to create the appropriate velocity of liquid flow across the membrane.

Those of skill in the art are aware of a number of membrane packages that can be used for reverse osmosis, including spiral-wound type, tubular type, "plate and frame" type designs, tubular membranes, and various forms of fiber type membranes. In a preferred embodiment, two types of spiral-wound RO membranes made by Osmonics, Inc. (Vista, Calif.), AG2540 and SE2540, are used.

E. Chemical Flocculation

Chemicals may be added in any of anaerobic, aerobic, sludge holding member and sludge dewatering device, filtration device or conduits for enhancing solid-liquid separation. Chemicals can be added in one location or multiple locations. The list of chemicals can include: metal salts (aluminum sulfate, ferric chloride, etc.), lime, and organic polymers. For examples of desalinization devices see Cheremisinoff, P. N. 1995. *Handbook of Water and Wastewater Treatment Technology*. Marcel Dekker, Inc. 270 Madison Avenue, New York, N.Y. 10016, herein incorporated by reference for all purposes.

V. Operation of the Integrated Wastewater Treatment System

The operation of the system of the invention will become apparent by reference to FIGS. 1–4. The principle outlined herein with reference to this figure is equally applicable to those systems utilizing additional anaerobic reactors, aerobic reactors, filtration devices and desalinization devices, e.g., RO units.

Figure 2:
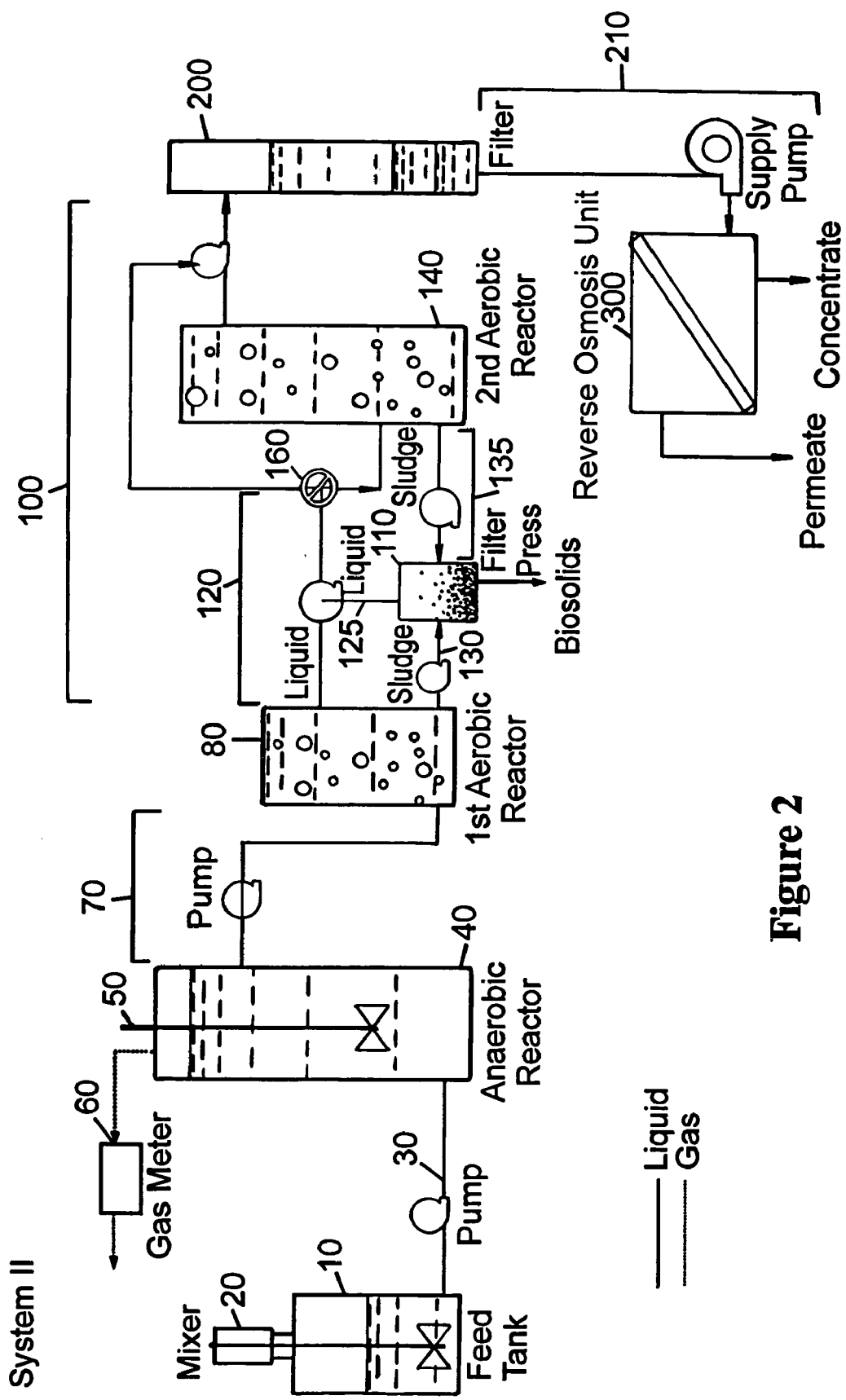
FIG. 2.

The organic substrate is fed into the anaerobic reactor 40 through an inlet or the top of the vessel. The organic substrate can optionally be pretreated by mixing with a liquid in a feed tank 10 with a mixer 20. The feed tank is connected to the anaerobic reactor through a connecting means 30, which can optionally use a pump to facilitate movement of the organic substrate. A mixer 50 is used to mix the contents of the anaerobic reactor at regular intervals. The mixer can be, for example, a mechanical mixer as shown in FIGS. 1 and 2 or a gas circulation mixer as shown in FIG. 3. The anaerobic reactor also has a gas outlet connected to a gas collection means 60 for capturing the gas products of anaerobic reactor, including methane. If desired by the user, anaerobic or facultative bacteria, or beneficial enzymes can be added to the organic substrate.

After a period of treatment in the anaerobic reactor, the effluent of the anaerobic reactor, which contains both solids and liquid material, is transferred from the anaerobic reactor to a first aerobic reactor 80 via a first conduit 70. As before, the transfer of the material can be facilitated by a pump. If desired by the user, aerobic or facultative bacteria can be added to the material in the first aerobic reactor.

After a period of treatment in the first aerobic reactor, the liquid effluent (i.e., the liquid from the first aerobic reactor or from a sludge holding device) from the first aerobic reactor 80 can be further processed in a variety of ways. In one embodiment, the effluent can be transferred into a second conduit 100 for transfer directly to a filtration device 200. The second conduit can optionally comprise a second aerobic reactor 140 or a sludge holding member 110.

After a period of treatment in the first aerobic reactor 80, separation of the liquid and solid components(e.g., sludge) of the effluent can optionally be performed. Sludge settling can be achieved within the first aerobic reactor 80. A quiescent settling period is allowed in the first aerobic reactor 80 to allow solids to settle before the clarified liquid effluent is removed and transferred through the second conduit 100 to another step for further treatment.

One embodiment is shown in FIG. 1. The first aerobic reactor 80 is connected to the second conduit 100 comprising a sludge holding member 110 (e.g., a sludge settling tank as in FIG. 1). Effluent can be transferred from the first aerobic reactor 80 into the sludge settling tank and solids allowed to settle before transfer of the clarified liquid through the second conduit 100 to another step in the process.

A second embodiment is shown in FIG. 2. The first aerobic reactor is connected to the second conduit, which further comprises a first liquid conduit 120 between the first aerobic reactor 80 and the second aerobic reactor 140 or the filtration device 200. The sludge can be periodically removed from the first aerobic reactor 80 through a first sludge conduit 130 that connects the first aerobic reactor and a sludge holding member 110, which as shown comprises a sludge dewatering device, e.g., a filter press, a screw press, or a belt press. After dewatering, the liquid effluent is transferred from the sludge holding member 110 via a second liquid conduit 125 to the first liquid conduit and then to the next step in the process. In an alternative embodiment, a sludge dewatering device, e.g., a filter press, a screw press, or a belt press, is used to dewater effluent from an aerobic reactor without use of a sludge holding member.

Another embodiment is shown in FIG. 3. The first aerobic reactor 80 (denoted SBR1 in FIG. 3) comprises a sludge draw 90 for removal of sludge. The sludge draw is essentially the same as a sludge holding member.

As described above, the liquid from the first aerobic reactor 80 can be allowed to settle in the first aerobic reactor 80 or in the sludge holding member 110. After settling, the clarified effluent from either the first aerobic reactor 80 or the sludge holding member 110 can be transferred into the a second aerobic reactor 140 or transferred directly to the filtration device 200. The a second aerobic reactor 140 is used when the purpose is to nitrify the effluent derived from the first aerobic reactor 80. The effluent is treated until the desired level of nitrification is achieved within the a second aerobic reactor 140. The a second aerobic reactor 140 can optionally be connected to the sludge holding member 110 via a second sludge conduit 135. (See, e.g., FIG. 2).

Both the first and second aerobic reactors can be aerated by an aeration device 150 using compressed air/oxygen or mechanical aerators. See, e.g., FIG. 3, The added gases can be humidified if desired by the user. If a second aerobic reactor is used, the waste liquid is treated until the desired level of nitrification is achieved.

The second conduit 100 can also comprise a valve 160 and at least two passageways: a passageway from the first aerobic reactor 80 to the sludge holding member 110 and then to the filtration device 200; and a passageway from the first aerobic reactor 80 to the sludge holding member 110, then to the a second aerobic reactor 140, and then to the filtration device 200. The valve 160 is used to select transfer of liquid from the first aerobic reactor 80 (or a sludge holding member 110) directly to the filtration device 200; or to select transfer of liquid from the first aerobic reactor 80 (or a sludge holding member 110) to the a second aerobic reactor 140 and then to the filtration device 200. Pumps can also be used to facilitate transfer of effluent through the second conduit 100.

The filtration device 200 is used to remove remaining suspended solids from the effluent derived from either the first aerobic reactor 80, the a second aerobic reactor 140, or from the sludge holding member 110. In some embodiments, a sand filter is used. See, e.g., FIG. 3. A sand filter is comprised of sections with progressively smaller sizes of sand grains. Alternatively, a microfilter, a belt filter, a pressure filter, a vacuum filter, an activated charcoal filter, or biomass filter can be used instead of or in addition to a sand filter. Filters can be combined depending on the needs of the user and the size of suspended solids present in the effluent. In addition multiple filters can be used, also as needed by the user.

Flocculent chemicals may be added in any of anaerobic, aerobic, sludge holding member and sludge dewatering device, filtration device or conduits for enhancing solid-liquid separation. Flocculent chemicals can be added in one location or multiple locations. The list of flocculent chemicals can include: metal salts (aluminum sulfate, ferric chloride, etc.), lime, and organic polymers. For examples of desalinization devices see Cheremisinoff, P. N. 1995. *Handbook of Water and Wastewater Treatment Technology*. Marcel Dekker, Inc. 270 Madison Avenue, New York, N.Y. 10016, herein incorporated by reference for all purposes.

Desalinization devices are used to remove organic and inorganic compounds (mainly soluble) from the filtration device effluent. Use of desalinization device can result in highly purified water as an end product. Desalinization devices remove soluble materials by size or by charge. Separation by size is done using reverse osmosis membrane separation units or ultrafiltration units, for example. Separation by charge is done using activated carbon filters or ion exchange resins. These devices can be used alone or in combination. For examples of desalinization devices see Cheremisinoff, P. N. 1995. *Handbook of Water and Wastewater Treatment Technology*. Marcel Dekker, Inc. 270 Madison Avenue, New York, N.Y. 10016, herein incorporated by reference for all purposes.

In a preferred embodiment, the effluent of the filtration device 200 is transferred from a effluent outlet via a third conduit 210 to a reverse osmosis unit 300. A conventional reverse osmosis unit is shown in FIG. 2. The reverse osmosis unit has a feed tank 310 that is connected to a pump 320. Pressure in the system can be measured using a pressure gauge 330 and regulated by a pressure regulator 380. The reverse osmosis membrane 350 is contained in a column 340. Permeate leaves the reverse osmosis membrane through a permeate outlet 360, and a reject or concentrate outlet 370. The concentrate is optionally recycled through the reverse osmosis unit until the volume of the concentrate reaches a desired fraction of the starting volume of liquid, for example 10% of total liquid.

All references and patent publications referred to herein are hereby incorporated by reference herein. As can be appreciated from the disclosure provided above, the present invention has a wide variety of applications. Accordingly, the following examples are offered for illustration purposes and are not intended to be construed as a limitation on the invention in any way.

EXAMPLES

A laboratory scale wastewater treatment system is shown in FIG. 3. The system consisted of the following elements connected in series: an Anaerobic Sequencing Batch Reactor (ASBR), two Aerobic Sequencing Batch Reactors (SBR1 and SBR2), a sand filter, and a reverse osmosis membrane unit (RO). The ASBR and two SBRs were all made of clear acrylic tubes of 4 in. inside diameter. The ASBR had a working volume of twelve liters and was heated by using a hot water jacket built outside of the reactor. The temperature inside the reactor was kept at 35±1° C. throughout the operation. SBR1 had a working volume of four liters and SBR2 had a working volume of seven and a half liters. SBR1 and SBR2 were operated at ambient temperature of 18° to 20° C. The sand filter and RO unit were also operated at ambient temperature.

Example 1

Swine Manure Collection and Preparation

Swine manure was collected on the Swine Research Farm of the University of California at Davis (UC Davis). The pigs on the farm were 16–20 weeks old. The manure was collected from a concrete floor and tap water was added to make a slurry. The manure slurry was screened with two sieves having openings of 4×4 mm and 2×2 mm, respectively, to remove hairs and large particles. The screened manure was immediately stored in a freezer at −20° C. until use. When needed, the stored manure was thawed, analyzed, and diluted with tap water to obtain desired volatile solids (VS). Due to loss of urine prior to manure collection, the collected manure contained a relative low content of $NH_3$—N. Urea was added into the manure to increase the $NH_3$—N concentration to a typical level found in fresh manure on commercial swine farms. The prepared manure was then stored in a refrigerator at 4° C.

Example 2

Anaerobic Treatment of Swine Manure Wastewater

Prepared swine manure was used as feed for Anaerobic Sequencing Batch Reactor (ASBR). The ASBR was designed to treat swine manure with 1.5% volatile solids (VS). This solid level is within the VS range encountered in swine manure collected in a typical pit-recharge or flushing system. The ASBR was initially seeded with 10 liters of sludge obtained from a mesophilic anaerobic digester at Davis Wastewater Treatment Plant. The total solids (TS) and VS of the seed sludge were 5.3% and 3.1%, respectively.

The ASBR was first started at a loading rate of 0.5 gVS/L/day using swine manure of 1% TS as the influent. The loading rate was increased to 1.0 gVS/L/day. After the ASBR reached steady state operation as indicated by steady daily biogas production, the influent TS was increased to 1.5% and the loading rate was gradually increased to 3 gVS/L/day as shown in Table 1. After the ASBR reached a steady state at 3 gVS/L/day, the effluent was discharged into SBR1 for aerobic treatment. Steady state of the ASBR was defined as a variation of less than 5% of daily biogas production within a one-week period. The hydraulic retention time (HRT) of the ASBR was reduced from 20 days at 1 gVS/L/day and 1% influent TS, initially, to 5 days at to 3 gVS/L/day and 1.5% influent TS. Typically, it took about two weeks for the ASBR to reach a steady state operation after a new loading rate was introduced.

The ASBR was fed four times a day and mixed by gas recirculation for 3 minutes each hour. Each treatment cycle was six hours total and included two minutes feeding, four hours reacting, one hour and 56 minutes settling, and two minutes decanting. Feeding, mixing, and decanting were performed with three peristaltic pumps (Masterflexes with Easy-load II, Cole Parmer Instrument Company, Vernon Hills, Ill.) that were controlled by a digital timer (ChronTrol, Lindburg Enterprises, Inc., San Diego, Calif.).

Biogas production of the ASBR was continuously measured with a low-flow gas meter. The pH of the ASBR contents was monitored once a week. Once the daily biogas production was stable (less than 5% variation) at a given loading rate, the performance data of the reactor were collected by sampling the influent and effluent on three consecutive days and analyzed for COD, TS, VS, SS, volatile suspended solids (VSS), VFA, TKN, $NH_3$—N, and total coliforms (TC) and $E.\ coli$. Biogas was also sampled and analyzed $CH_4$ and $CO_2$ by using a Gas Chromatograph (GC) (Hewlett Packard Company, Avondale, Pa.) equipped with a thermal conductivity detector (TCD) and a glass packed column (Alltech Associates, Inc., Deerfield, Ill.). The reductions of various constituents in the manure after anaerobic digestion were calculated based on mass balances in the influent and effluent.

Performance data of the ASBR at different loading rates, including TS and VS reductions, biogas yield, and $CH_4$ yield, are shown in Table 1. There was a slight decrease in the solids reductions and biogas yield as the loading rate was increased. The HRT also decreased, but the decrease was less than 4.5% when the loading rate was increased by six fold (from 0.5 to 3.0 gVS/L/day).

Three grams VS/L/day was chosen to be the final loading rate for system treatment using the ASBR. The $CH_4$ content of biogas was around 72%. The performance data of the ASBR at 3 gVS/L/day are shown in Table 2. The reductions of COD, TS, VS, SS and VSS were 41.9%, 35.6%, 45.8%, 36.1%, and 45.0%, respectively. The $NH_3$—N in the effluent was 54.7% higher than in the influent. About 25% organic nitrogen in the influent was converted into ammonia nitrogen in the effluent. Anaerobic treatment resulted in more than one log reduction in total coliforms and $E.\ coli$.

TABLE 1

Performance data of the ASBR at different VS loading rates.

| Influent VS conc. mg/L | HRT day | Loading Rate gVS/L/d | TS Reduction % | VS Reduction % | Biogas Yield L/gVS fed | $CH_4$ Yield L/gVS fed | pH |
|---|---|---|---|---|---|---|---|
| 10,000 | 20 | 0.5 | 40.0 | 50.0 | 0.51 | 0.38 | 7.12 |
| 10,000 | 10 | 1.0 | 38.9 | 50.0 | 0.50 | 0.36 | 7.07 |
| 15,000 | 10 | 1.5 | 37.9 | 48.7 | 0.50 | 0.35 | 6.94 |
| 15,000 | 6.7 | 2.25 | 37.0 | 46.8 | 0.48 | 0.33 | 7.11 |
| 15,000 | 5 | 3.0 | 35.6 | 45.8 | 0.47 | 0.33 | 7.03 |

[1]450 mg/L of $NH_3$-N added

TABLE 2

Performance data of the ASBR at the loading rate of 3 gVS/L/day

| | ASBR | | |
|---|---|---|---|
| Parameter | Influent, mg/L | Effluent, mg/L | Reduction, % |
| COD | 24300 | 13600 | 44.0 |
| TS | 22636 | 14585 | 35.6 |
| VS | 16355 | 8872 | 45.8 |
| SS | 18777 | 11995 | 36.1 |
| VSS | 14149 | 7777 | 45.0 |
| TN | 1601 | 1650 | NA |
| TKN | 1601 | 1650 | NA |
| $NH_3$—N | 503 | 778 | NA |
| $NO_2$—N | 0 | 0 | NA |
| $NO_3$—N | 0 | 0 | NA |
| pH | 6.63 | 7.11 | NA |
| $E.\ coli$. (CFU) | 423333 | 34000 | 92.0 |
| T.C (CFU) | 3733333 | 126000 | 96.6 |

Example 3

Aerobic Treatment of Swine Manure Wastewater

The effluent of ASBR was directly decanted into SBR1 for further treatment. The treatment objective of SBR1 was to further reduce the organic matter and remove suspended solids from the liquid effluent. Ammonia oxidation (nitrification) was controlled at a low level by using relatively short HRT and solid retention time (SRT). The SBR1 was initially seeded with the activated sludge obtained from an oxidation ditch at the Wastewater Treatment Plant of the University of California at Davis. SBR1 was operated at two day HRT with dissolved oxygen (DO) controlled at approximately two mg/L. SBR1 was aerated with compressed air that was humidified by traveling through a 15-liter water container at a flow rate of 1.75 L/min. Air was delivered into the reactor through two air stone diffusers installed near the bottom of the reactor to ensure even air distribution.

The operating sequence of SBR1 was the same as ASBR, but sludge draw was added between the decanting and feeding of SBR1. At the end of the settling period, the depth of sludge was maintained to be about equivalent to the depth of liquid supernatant by adjusting the amount of sludge drawn.

The suspended solids (SS) of the mixed liquor in SBR1 prior to decanting was maintained at around 2% and the SRT was 5 days. Sludge was drawn into a small settling tank and, after six hours of settling, half the sludge volume became clear liquid, was decanted from the settling tank, and then combined with the supernatant of SBR1. The sludge in the settling tank was disposed of separately. The liquid effluent was low in organic content and high in ammonia content. To study the treatment of this liquid effluent by using sand filtration and reverse osmosis (RO) membrane separation, 57 liters of the liquid effluent was collected over one month and stored at −20° C. until used in the separation test.

After enough liquid effluent was collected from SBR1 for the RO test, SBR2 was brought on line. The liquid effluent of SBR1 was discharged directly into SBR2 for further treatment. SBR2 was used to partially nitrify the liquid effluent. The HRT and SRT of SBR2 were 4 and 46 days, respectively. The SRT of SBR2 was not controlled. SBR2 was aerated in the same way as SBR1. The airflow rate was 0.55 L/min and the DO in the reactor was about 7.5 mg/L. The SBR2 was initially seeded with two liters of sludge drawn from SBR1. After about two weeks satisfactory nitrification was achieved.

The SBR2 had the same operational sequence as the SBR1, except that no sludge was drawn from SBR2. After SBR2 reached a steady state, 57 liters (15 gallons) of effluent was collected and stored at −20° C. until used in the RO test.

SBR1 was first monitored by measuring the SS in the liquid effluent. When SS varied less than 5% during a one-week period, SBR1 was at steady state. SBR1 influent and two effluents, liquid effluent and sludge effluent, were then sampled and analyzed for the same constituents as for ASBR, as well as $NO_2$—N and $NO_3$—N concentrations. Reductions of these constituents in liquid effluent and total effluent (liquid+sludge) were calculated based on concentration differences and mass balances, respectively.

SBR2 was monitored by measuring $NO_2$—N and $NO_3$—N concentrations in the effluent. When $NO_2$—N and $NO_3$—N varied less than 5% during a one-week period, SBR2 was at steady state. The influent and effluent were sampled and analyzed in the same way as SBR1, except that SBR2 did not have sludge effluent.

Performance data of SBR1 and SBR2 are shown in Table 3. Reductions in percentages were based on the influent of each reactor. Both SBRs were highly effective in removing COD and solids (TS, VS, SS and VSS) from the liquid effluent through a combination of biological oxidation and solid settling. The reductions of suspended solids (SS and VSS) in the liquid effluent of SBR1 were 90% and reduction of COD was 80% based on the influent of SBR1. After settling, the liquid effluent had 87.5% of the influent volume. Ammonia was partially oxidized in SBR1. The total nitrogen (TN) was off-balance in the total effluent by 18%. The TN loss might be caused by a combination of ammonia volatilization and denitrification. Ammonia volatilization is considered to be the major cause because of the elevated pH level (8.35). In SBR2, further COD reduction, solids reduction, and nitrification were achieved.

The overall performance data of ASBR, SBR1, and SBR2 are shown in Table 4. Reductions in percentages were based on the influent characteristics of the ASBR. After SBR2, the reductions of COD, TS, VS, SS and VSS reached 91.7%, 88.6%, 93.0%, 96.4%, and 97.1%, respectively. Total coliforms (T.C.) and *E Coli* were reduced by nearly 3 logs, indicating an effective destruction of fecal bacteria during anaerobic and aerobic processing. The pH of the manure changed as it was processed in the system. The initial manure pH of 6.63 increased to 7.11 in the ASBR, to 8.35 in SBR1, and then decreased to 7.31 in SBR2.

TABLE 3

Performance data of SBR1 and SBR2.

| Parameter | Influent mg/L | SBR1 Effluent, mg/L Liquid | SBR1 Effluent, mg/L Sludge | SBR1 Reduction, % Liquid | SBR1 Reduction, % Total | SBR2 Effluent mg/L | SBR2 Reduction % |
|---|---|---|---|---|---|---|---|
| COD | 13600 | 2780 | 27300 | 80 | 34 | 1950 | 30 |
| TS | 14585 | 3460 | 28397 | 76 | 34 | 2584 | 25 |
| VS | 8872 | 1664 | 17596 | 81 | 36 | 1137 | 32 |
| SS | 11995 | 1171 | 26223 | 90 | 38 | 679 | 42 |
| VSS | 7777 | 747 | 16775 | 90 | 39 | 407 | 46 |
| TN | 1650 | 951 | 2591 | 42 | 18 | — | — |
| TKN | 1650 | 730 | 2350 | 56 | 31 | — | — |
| $NH_3$—N | 778 | 553 | 613 | 29 | 27 | 277 | 50 |
| $NO_2$—N | 0 | 91 | 91 | NA | NA | 244 | NA |
| $NO_3$—N | 0 | 150 | 150 | NA | NA | 547 | NA |
| *E. coli*, (CFU)[1] | 34000 | 1800 | 21333 | 95 | 80 | 533 | 70 |
| T.C, (CFU) | 126000 | 20933 | 89667 | 83 | 70 | 2000 | 90 |

TABLE 4

Overall performance data of the ASBR-SBRs system

| | Reduction[1], % | | |
|---|---|---|---|
| Parameter | ASBR | SBR1 | SBR2 |
| COD | 44 | 89 | 92 |
| TS | 36 | 85 | 89 |
| VS | 46 | 90 | 93 |
| SS | 36 | 94 | 96 |
| VSS | 45 | 95 | 97 |
| TN | −3 | 41 | 28 |
| TKN | −3 | 54 | 77 |
| *E. coli.* | 92.0 | 99.6 | 99.9 |
| Total Coliform | 96.6 | 99.4 | 99.9 |

[1]Based on influent of ASBR

Example 4

Sand filtration of the Aerobic Reactor Effluent

A lab-scale sand filter was built and used remove suspended solids from the liquid effluent before reverse osmosis treatment to prevent fouling of membranes. The design-loading rate of the sand filter was 100 m/d with a surface area of 0.0017 m$^2$ (2.76 in$^2$). (Davis, M. and D. Cornwell. Introduction to environmental engineering, 3rd Edition. McGraw-Hill, New York, N.Y. (1998)). The total depth of the sand filter was 0.61 m (24 in) and consisted of four sections with different sizes of sand grain. Sand grains were sized and selected using standard sieves (Newark Wire Cloth Company, Newark, N.J.). The sand grain size and depth of each section are shown in Table 5. When treating the liquid effluent of SBR1, the sand filter had to be frequently backwashed using tap water due to the high SS in the liquid.

TABLE 5

Sand grain size and depth of different sections of sand filter

| U.S. Std. Sieve No. | Sand grain size, mm | Depth mm |
|---|---|---|
| 30–40 | 0.505 | 127 |
| 16–20 | 1 | 114 |
| 12–16 | 1.42 | 254 |
| Above 4 | Gravel | 114 |

Two liquid effluents of 57 L (15 gal) each from SBR1 or SBR2 were filtered through the sand filter before reverse osmosis treatment to remove suspended solids. Liquid effluent was sampled before and after sand filtration and analyzed for TS, VS, COD, TKN, $NH_3$—N, $NO_2$—N, $NO_3$—N, EC, and pH. To determine the effectiveness of sand filtration in bacterial removal, the liquid effluent from SBR2 was filtered immediately as it was produced and analyzed for reduction of total coliforms (T.C.) and $E\ coli$. Results are shown in Table 6. the sand filter worked well in reducing suspended solids in the liquid effluent. Nitrogen elements, including nitrite and nitrate, were also removed.

TABLE 6

Performance data of the sand filter.

| | SBR1 Liquid Effluent | | SBR2 Liquid Effluent | |
|---|---|---|---|---|
| Composition | Conc. after Sand Filtration (mg/L) | Reduction (%) | Conc. after Sand Filtration (mg/L) | Reduction (%) |
| COD | 2610 | 6 | 1340 | 31 |
| TS | 2947 | 19 | 2580 | 0 |
| VS | 1324 | 20 | 1047 | 8 |
| SS | 692 | 41 | 160 | 76 |
| VSS | 428 | 43 | 99 | 76 |
| TN | 1001 | 9 | 869 | 14 |
| TKN | 270 | 5 | 690 | 27 |
| $NH_3$—N | 504 | 9 | 250 | 10 |
| $NO_2$—N | 46 | 5 | 231 | 6 |
| $NO_3$—N | 133 | 9 | 500 | 7 |

Example 5

Reverse Osmosis of the Sand Filter Effluent

A membrane separation test unit shown in FIG. 4 was used for performing RO treatment tests. Two types of spiral-wound RO membranes provided by Osmonics, Inc. (Vista, Calif.), AG2540 and SE2540, were tested with each liquid effluent (e.g., SBR1 effluent and SBR2 effluent). The membrane specifications are found in Table 7. For AG2540, the specifications were based on a 2,000 mg/L NaCl solution at 1,551 kPa (225 psig) operating pressure, 25° C. (77° F.) temperature, 7.5 pH, and 15% recovery. For SE2540, the specifications were based on a 2,000 mg/L NaCl solution at 2,930 kPa (425 psig) operating pressure, 25° C. (77° C.) temperature, 6.5 pH, and 15% recovery.

TABLE 7

RO membrane specifications

| Model | Feed spacer mm (mil) | Active area $m^2$ ($ft^2$) | $M^3$/d (GPD) | Rejection % NaCl |
|---|---|---|---|---|
| AG2540 | 0.76 (30) | 2.51 (27) | 2.68 (710) | 99.4 |
| SE2540 | 1.27 (50) | 1.77 (19) | 1.60 (422) | 98.5 |

Before performing the separation test, each new membrane was stabilized for thirty minutes under 670 kPa (100 psig) by using 57 L (15 gal) of a solution containing 250 mg/L $NH_3$—N and 250 mg/L $NO_3$—N. All the RO tests were run as batch operations. During each operation, the membrane was stabilized by processing the liquid effluent for ten minutes with both reject and permeate returned to the feed tank. Then 57 L liquid effluent was processed continuously with the reject being returned into the feed tank and permeate collected separately until the volume of remaining liquid in the feed tank reached 10% of the original volume or 90% of volume reduction (VR). The feed inlet pressure for different tests was set and controlled for achieving about 10% recovery of water (permeate). After each test run, the membrane was cleaned by running the unit with 38 L (10 gal) tap water followed by 15 L (4 gal) distilled and de-ionized water under pressure.

For the RO unit, samples of reject and permeate were taken when the volume reduction in the source tank reached 50% and 90%. Samples of 500 mL each were analyzed for TN, TKN, $NH_3$—N, $NO_2$—N, $NO_3$—N, and electric conductivity (EC). The rejection factors and yields of TN, TKN, $NH_3$—N, $NO_2$—N, $NO_3$—N at different volume reductions were calculated. The rejection factor was defined as the difference between the concentrations of a particular nutrient in reject and permeate and divided by the concentration in the reject. The yield was defined as Yield=(volume of concentrate X concentration in concentrate)/(volume of feed X concentration in feed)

The rejection factor is an indicator of the performance of the RO membrane during operation. The yield reflects the efficiency of the concentration process for retaining the desired components.

Additional samples of 100 mL each were taken from both reject and permeate during the test for quick measurement of EC to monitor the performance of the membrane during the test. The samples were returned to the feed tank after measurement. The feeding line pressure, permeate temperature, and permeate flow rate were also measured and recorded.

Analysis of TS, VS, SS, VSS, VFA, TC, and $E.\ Coli$ was performed using standard methods (APHA. 1998. Standard methods for the examination of water and wastewater, 20th Edition. American Public Health Association, Washington D.C.). The $NH_3$—N, pH, EC, and temperature were measured with an Accumet meter (Fisher Scientific, PA, USA) using a gas-sensing electrode, pH electrode, conductivity cell, and temperature probe, respectively. The COD, TKN, $NO_3$—N, and $NO_2$—N were analyzed using HACH methods (Hach Company. 1997. Water analysis handbook, $3^{rd}$ Edition. Loveland, Colo.). DO was measured using a DO meter (YSI Model 58).

The rejection factors and yields of different nutrients at different volume reductions are found in Tables 8 and 9. In general, the performance of RO membrane AG2540 was better than that of membrane SE2540 for recovering nutrients from the liquid effluent and yielding clean water. When the volume of the concentrate was 50% of original feed volume, it contained about 90% of nitrogen in the feed. When the volume of the concentrate reached 10% of the original volume, the concentrate contained about 70% of the original nitrogen concentration. The yield of other elements, including P, K, Cl, Ca, Mg, Na, Zn, Fe, Cu, in the concentrate was mostly over 95%, except that the yields of K, Cl, Na at 90% volume reduction were slightly lower, 80–92%. The concentrate can be potentially used as plant fertilizer.

TABLE 8

Nitrogen and other elemental recovery from SBR1 liquid effluent after RO membrane separation

| Nutrients | AG2540 | | | | SE2540 | | | |
|---|---|---|---|---|---|---|---|---|
| | Rejection Factor | | Yield, % | | Rejection Factor | | Yield, % | |
| (mg/L) | 50% VR | 90% VR | 50% VR | 90% VR | 50% Vr | 90% VR | 50% VR | 90% VR |
| TN | 0.84 | 0.80 | 90 | 70 | 0.84 | 0.73 | 91 | 67 |
| TKN | 0.81 | 0.76 | 86 | 61 | 0.86 | 0.76 | 92 | 70 |
| $NH_3$—N | 0.85 | 0.79 | 92 | 72 | 0.87 | 0.69 | 92 | 66 |
| $NO_2$—N | 0.85 | 0.83 | 91 | 72 | 0.85 | 0.61 | 93 | 64 |
| $NO_3$—N | 0.85 | 0.79 | 92 | 72 | 0.59 | 0.47 | 82 | 44 |
| P | 1.00 | 1.00 | 100 | 100 | 1.00 | 1.00 | 100 | 100 |
| K | 0.97 | 0.96 | 98 | 90 | 0.94 | 0.72 | 96 | 89 |
| Cl | 0.94 | 0.96 | 96 | 92 | 0.92 | 0.80 | 95 | 91 |
| Ca | 1.00 | 1.00 | 100 | 100 | 1.00 | 0.99 | 100 | 100 |
| Mg | 1.00 | 1.00 | 100 | 99 | 1.00 | 0.98 | 100 | 99 |
| Na | 0.97 | 0.97 | 98 | 90 | 0.93 | 0.72 | 95 | 89 |
| Zn | 1.00 | 1.00 | 100 | 100 | 1.00 | 1.00 | 100 | 100 |
| Fe | 0.97 | 1.00 | 98 | 100 | 0.96 | 1.00 | 97 | 99 |
| Cu | 1.00 | 1.00 | 100 | 100 | 1.00 | 1.00 | 100 | 100 |

VR—Volume reduction

TABLE 9

Nitrogen and other elemental recovery from SBR2 liquid effluent after RO membrane separation

| Nutrients | AG2540 | | | | SE2540 | | | |
|---|---|---|---|---|---|---|---|---|
| | Rejection Factor | | Yield (%) | | Rejection Factor | | Yield (%) | |
| (mg/L) | 50% VR | 90% VR | 50% VR | 90% VR | 50% VR | 90% VR | 50% VR | 90% VR |
| TN | 0.85 | 0.87 | 89 | 71 | 0.83 | 0.74 | 90 | 66 |
| TKN | 0.87 | 0.89 | 88 | 71 | 0.75 | 0.76 | 86 | 60 |
| $NH_3$—N | 0.83 | 0.86 | 88 | 68 | 0.88 | 0.80 | 93 | 74 |
| $NO_2$—N | 0.80 | 0.87 | 91 | 75 | 0.85 | 0.75 | 90 | 67 |
| $NO_3$—N | 0.78 | 0.63 | 88 | 58 | 0.85 | 0.73 | 92 | 69 |
| P | 1.00 | 1.00 | 100 | 100 | 1.00 | 1.00 | 100 | 100 |
| K | 0.93 | 0.87 | 95 | 90 | 0.95 | 0.90 | 94 | 91 |
| Cl | 0.98 | 0.95 | 98 | 96 | 0.98 | 0.96 | 97 | 96 |
| Ca | 1.00 | 1.00 | 100 | 99 | 1.00 | 0.99 | 100 | 99 |
| Mg | 1.00 | 1.00 | 100 | 99 | 1.00 | 0.99 | 100 | 99 |
| Na | 0.95 | 0.92 | 97 | 91 | 0.97 | 0.91 | 93 | 90 |
| Zn | 1.00 | 1.00 | 100 | 100 | 1.00 | 1.00 | 100 | 100 |
| Fe | 0.95 | 0.98 | 96 | 95 | 0.96 | 0.95 | 100 | 96 |
| Cu | 1.00 | 1.00 | 100 | 100 | 1.00 | 1.00 | 100 | 100 |

Reclamation of water from the swine wastewater is also very important. Using the integrated system, the reclaimed water (permeate) was very clear. Quality characteristics are listed in Table 10.

TABLE 10

Characteristics of permeate water with different membranes at different volume reductions (VR) in the feed tank

| Composition (mg/L) | SBR1 Effluent | | | | SBR2 Effluent | | | |
|---|---|---|---|---|---|---|---|---|
| | AG2540 | | SE2540 | | AG2540 | | SE2540 | |
| | 50% VR | 90% VR | 50% VR | 90% VR | 50% VR | 90% VR | 50% VR | 90% VR |
| COD | 8 | 23 | 15 | 132 | 48 | 195 | 55 | 220 |
| TDS | 264 | 328 | 259 | 1337 | 325 | 788 | 336 | 1156 |
| VDS | 59 | 92 | 52 | 79 | 145 | 264 | 125 | 372 |
| TN | 131 | 241 | 177 | 778 | 276 | 757 | 286 | 818 |
| TKN | 105 | 180 | 135 | 600 | 75 | 165 | 75 | 135 |
| $NH_3$—N | 104 | 171 | 107 | 612 | 49 | 149 | 41 | 128 |
| $NO_2$—N | 6 | 16 | 9 | 72 | 61 | 152 | 61 | 183 |
| $NO_3$—N | 20 | 45 | 33 | 106 | 140 | 440 | 150 | 500 |
| P | 0.1 | <0.1 | <0.1 | 0.1 | 0.1 | 0.1 | 0.1 | 0.1 |
| K | 13.0 | 36.0 | 31.0 | 401.0 | 36.0 | 148.0 | 45.0 | 167.0 |
| Cl | 0.3 | 0.5 | 0.4 | 3.1 | 0.3 | 1.7 | 0.6 | 1.9 |
| Ca | <1 | <1 | <1 | 2.0 | <1 | <1 | <1 | 3.0 |
| Mg | <1 | <1 | <1 | 1.0 | <1 | <1 | <1 | 1.0 |
| Na | 7.0 | 19.0 | 21.0 | 218.0 | 30.0 | 119.0 | 57.0 | 208.0 |
| Zn | 0.1 | 0.1 | <0.1 | 0.1 | <0.1 | 0.1 | <0.1 | <0.1 |
| Fe | 0.1 | <0.1 | 0.2 | <0.1 | 0.1 | 0.1 | <0.1 | 0.2 |
| Cu | <0.1 | <0.1 | <0.1 | <0.1 | <0.1 | <0.1 | <0.1 | <0.1 |

Because of the solid concentration change during RO processing, the permeate flow rate, EC, feed inlet pressure, and permeate temperature changed as the volume of the liquid effluent was reduced (FIGS. 5 and 6). Generally, these parameters did not change much when the volume reduction was less than 60%. When the liquid effluent was concentrated further, the temperature and EC increased significantly. The increase of EC in the permeate reflects an increase of organic matter in the permeate. In order to reduce the loss of nutrients in the permeate, the recommend maximum volume reduction is 70% based on the EC data. In addition, the AG2540 RO membrane gave a higher permeate flow rate compared to the SE2540 RO membrane under a similar operating pressure.

What is claimed is:

1. A wastewater treatment system comprising:
   (a) an anaerobic reactor;
   (b) a first aerobic reactor;
   (c) a filtration device;
   (d) a desalinization device;
   (e) a first conduit connecting the anaerobic reactor to the first aerobic reactor;
   (f) a second conduit connecting the first aerobic reactor to the filtration device, wherein the second conduit comprises a second aerobic reactor to accept an effluent from the first aerobic reactor; and
   (g) a third conduit connecting the filtration device to the desalinization device.

2. The wastewater treatment system of claim 1, wherein the first aerobic reactor comprises an aeration device.

3. The wastewater treatment system of claim 1, wherein the second conduit comprises a valve to direct flow of liquid from the first aerobic reactor to the filtration device; or to direct flow of liquid from the first aerobic reactor to the second aerobic reactor, and then to the filtration device.

4. The wastewater treatment system of claim 1, wherein the second aerobic reactor comprises an aeration device.

5. The wastewater treatment system of claim 1, wherein the second conduit further comprises a sludge holding member.

6. The wastewater treatment system of claim 5, wherein the sludge holding member is a sludge settling tank.

7. The wastewater treatment system of claim 5, wherein the sludge holding member comprises a sludge dewatering device.

8. The wastewater treatment system of claim 7, wherein the sludge dewatering device is selected from the group consisting of a filter press, a screw press, or a belt press.

9. The wastewater treatment system of claim 1, wherein the second conduit further comprises
   a) a first liquid conduit, wherein the first liquid conduit connects the first aerobic reactor to the second aerobic reactor or to the filtration device; wherein liquid effluent is transferred from the first aerobic reactor to the second aerobic reactor or to the filtration device; and
   b). a first sludge conduit wherein the first sludge conduit connects the first aerobic reactor to the sludge holding member.

10. The wastewater treatment system of claim 9, further comprising a second liquid conduit, wherein the second liquid conduit connects the sludge holding member and the first liquid conduit.

11. The wastewater treatment system of claim 9, further comprising a second sludge conduit, wherein the second sludge conduit connects the second aerobic reactor and the sludge holding member.

12. The wastewater treatment system of claim 1, wherein the sludge holding member comprises a sludge dewatering device.

13. The wastewater treatment system of claim 12, wherein the sludge dewatering device is selected from the group consisting of a filter press, a screw press, or a belt press.

14. The wastewater treatment system of claim 1, wherein the anaerobic reactor is an Anaerobic Biofilm Sequencing Batch Reactor (ABSBR).

15. The wastewater treatment system of claim 1, wherein the anaerobic reactor is an Anaerobic Sequencing Batch Reactor (ASBR).

16. The wastewater treatment system of claim 1, wherein the anaerobic reactor comprises an anaerobic reactor gas outlet, wherein methane gas is captured from the anaerobic reactor gas outlet.

17. The wastewater treatment system of claim 1, wherein the filtration device is selected from the group consisting of a sand filter, a microfilter, a belt filter, a pressure filter, a vacuum filter, an activated charcoal filter, and biomass filter.

18. The wastewater treatment system of claim 1, wherein the desalinization device is selected from the group consisting of reverse osmosis membrane separation units, ultrafiltration units, activated carbon filters, and ion exchange resins.

19. The wastewater treatment system of claim 1, wherein the desalinization device is a reverse osmosis membrane separation units.

20. The wastewater treatment system of claim 19, wherein the reverse osmosis membrane separation unit comprises a reverse osmosis membrane separation unit permeate outlet, and a reverse osmosis membrane separation unit concentrate outlet.

21. The wastewater treatment system of claim 1, wherein the wastewater comprises food waste products.

22. The wastewater treatment system of claim 1, wherein the wastewater comprises animal waste products.

23. The wastewater treatment system of claim 1, wherein the wastewater comprises biological fermentation wastes.

24. A method of treating wastewater, the method comprising the steps of
   (a) treating for a first period, a first mixture comprising wastewater under anaerobic conditions in an anaerobic reactor to form an anaerobic reactor effluent;
   (b) treating for a second period, the anaerobic reactor effluent under aerobic conditions in a first aerobic reactor to form a first aerobic reactor effluent;
   (c) treating for a third period, the first aerobic reactor effluent under aerobic conditions in a second aerobic reactor to form a second aerobic reactor effluent;
   (d) passing the second aerobic reactor effluent through a filtration device to form a filtration device effluent; and
   (d) passing the filtration device effluent through a desalinization device to form a desalinization device effluent.

25. The method of claim 24, further comprising the step of removing sludge by collecting sludge in a sludge holding tank.

26. The method of claim 24, further comprising the step of removing sludge using a sludge dewatering device.

27. The method of claim 24, wherein the wastewater comprises food waste products.

28. The method of claim 24, wherein the wastewater comprises animal waste products.

29. The method of claim 24, wherein the wastewater comprises biological fermentation wastes.

30. The method of claim 24, wherein the anaerobic reactor is an Anaerobic Biofilm Sequencing Batch Reactor (AB-SBR).

31. The method of claim 24, wherein the anaerobic reactor is an Anaerobic Sequencing Batch Reactor (ASBR).

32. The method of claim 24, wherein the anaerobic reactor comprises an anaerobic reactor gas outlet and methane gas is captured from the anaerobic reactor gas outlet.

33. The method of claim 24, wherein the filtration device is selected from the group consisting of a sand filter, a microfilter, a belt filter, a pressure filter, a vacuum filter, an activated charcoal filter, and biomass filter.

34. The method of claim 24, wherein the desalinization device is selected from the group consisting of a reverse osmosis membrane separation unit, an ultrafiltration unit, an activated carbon filter, and an ion exchange resin.

35. The method of claim 24, wherein the desalinization device is a reverse osmosis membrane separation unit.

36. The method of claim 35, further comprising the step of passing the filtration device effluent through the reverse osmosis separation unit to form a reverse osmosis concentrate and a reverse osmosis permeate, wherein the reverse osmosis permeate is reclaimed water, and the reverse osmosis concentrate is concentrated liquid fertilizer.

37. The method of claim 24, further comprising the step of adding flocculent chemicals.

* * * * *

UNITED STATES PATENT AND TRADEMARK OFFICE
CERTIFICATE OF CORRECTION

PATENT NO.         : 7,045,063 B2
APPLICATION NO. : 10/626034
DATED              : May 16, 2006
INVENTOR(S)        : Ruihong Zhang Page 1 of 1

It is certified that error appears in the above-identified patent and that said Letters Patent is hereby corrected as shown below:

On the Title page: Item 54 and Column 1, delete "swine"

"Treatment of Wastewater By Biological and Membrane Separation Technologies"

Signed and Sealed this

Fifteenth Day of August, 2006

JON W. DUDAS
*Director of the United States Patent and Trademark Office*